United States Patent Office 3,205,979
Patented Sept. 14, 1965

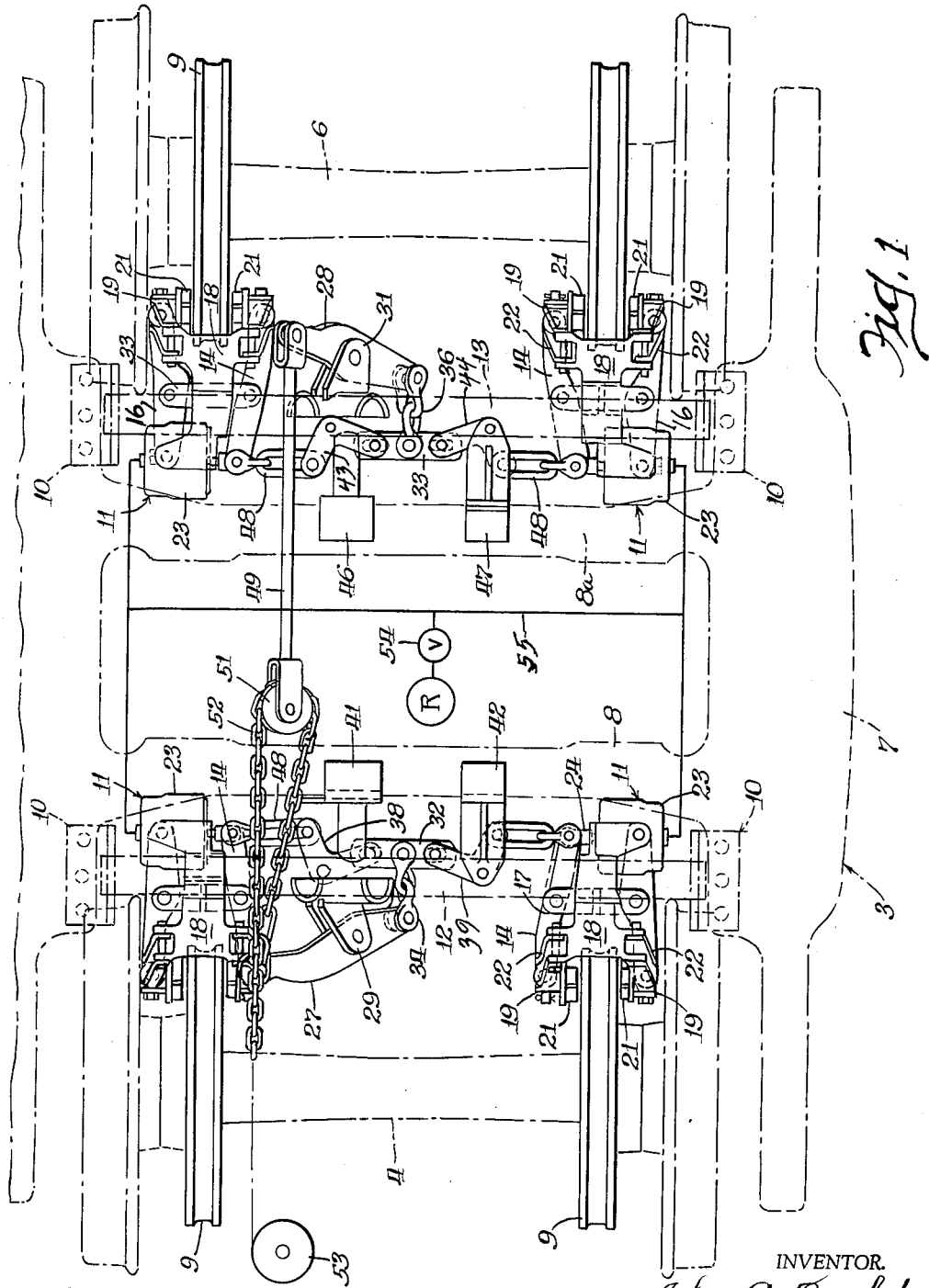

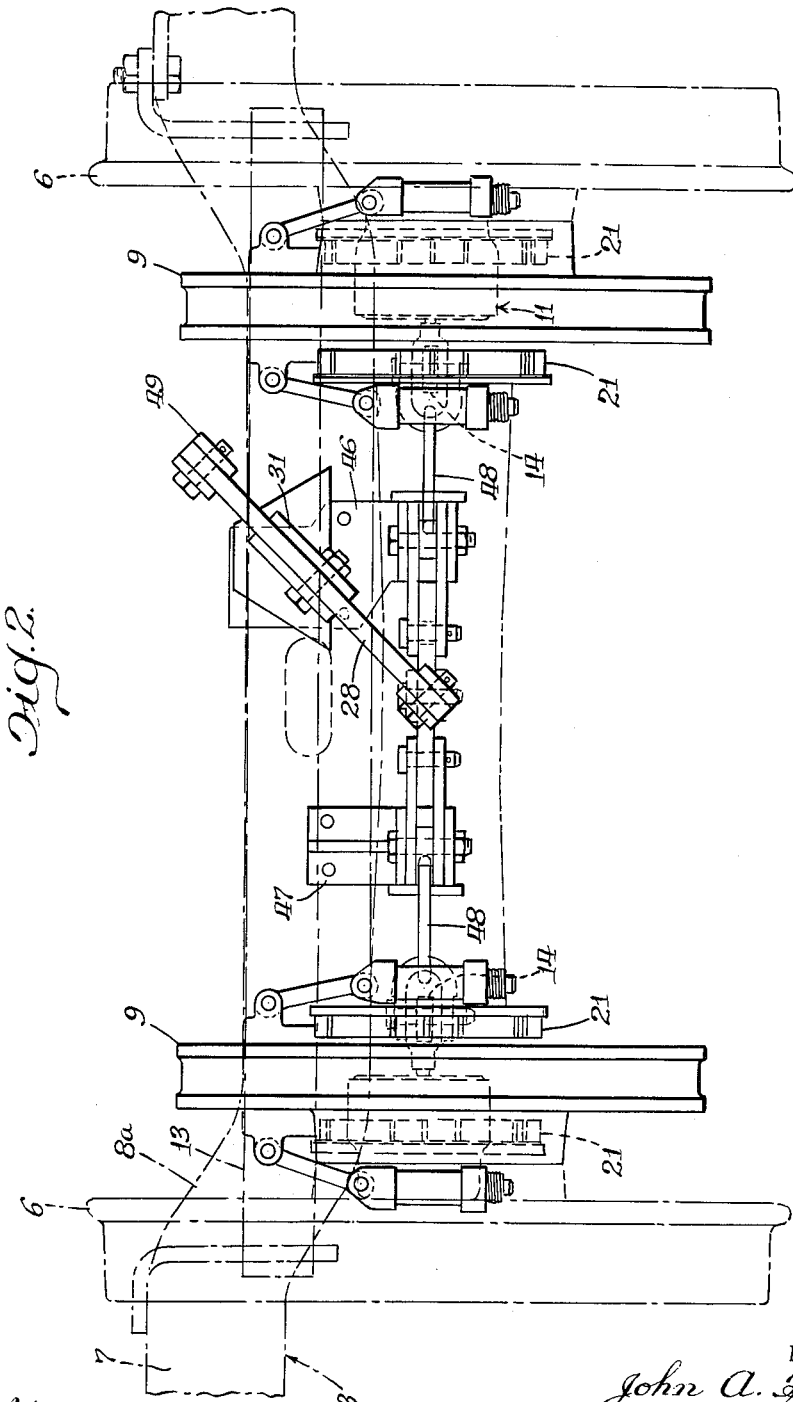

3,205,979
HANDBRAKE FOR ROTOR BRAKES
John A. Buvelot, Chicago, Ill., assignor to Amsted Industries Incorporated, Chicago, Ill., a corporation of New Jersey
Filed Aug. 12, 1963, Ser. No. 301,677
2 Claims. (Cl. 188—107)

This invention relates to rotor brake arrangements for four wheel railway car trucks and more particularly to a handbrake mechanism for manually actuating the rotor brakes to decelerate the truck.

Briefly, the present invention contemplates the provision of a truck comprising a frame supported on two wheel and axle assemblies, each assembly having two rotors secured thereon for engagement by individual brake mechanisms mounted on the truck frame and adapted to be actuated by a handbrake arrangement.

An object of the present invention resides in the provision of a handbrake arrangement adapted to simultaneously actuate four brake mechanisms to decelerate their respective wheel and axle assemblies.

Another object of the invention resides in the provision of a handbrake arrangement adapted to apply a substantially equal braking force to the several brake rotors during deceleration of the truck.

Another object of the invention relates to the provision of a handbrake arrangement which is relatively simple and inexpensive in construction and reliable in operation.

The invention embodies other novel features, details of construction and arrangement of parts which are hereinafter set forth in the specification and claims and illustrated in the accompanying drawings, forming part thereof, wherein:

FIGURE 1 is a top plan view of a railway car truck illustrating a rotor brake arrangement embodying features of the invention.

FIGURE 2 is an end elevation of the structure shown in FIGURE 1.

Referring now to the drawings for a better understanding of the invention, a conventional railway car truck is shown as comprising a truck frame 3 supported at its ends upon wheel and axle assemblies 4 and 6, the truck frame having side rails 7 interconnected by spaced transoms 8 and 8a. Two rotors 9 are secured to each wheel and axle assembly for engagement by their respective individual brake mechanisms 11 which are mounted on transverse members 12 and 13 secured at their ends of brackets 10 on the side rails 7.

The brake mechanisms 11 are shown as comprising inner and outer brake levers 14 and 16 pivotally interconnected intermediate their ends by links 17. Brake heads 19 are pivotally mounted on the brake levers 14 and 16 and provided with brake shoes 21 to frictionally engage opposite sides of a rotor 9. The brake heads are pivotally suspended from a bracket 18 by means of offset links 22. The brake levers are actuated by means of a power cylinder 23 which is secured to the bracket 18, pivotally connected to the outer lever 16 and provided with a piston rod 24 pivotally connected to the inner lever 14.

The four rotor brakes 11 are adapted to be manually actuated by means of a handbrake arrangement which is shown as comprising actuating levers 27 and 28 pivotally mounted intermediate their ends on brackets 29 and 31, respectively, secured to the transverse members 12 and 13, respectively. The lower ends of the levers 27 and 28 are connected to the medial portions of equalizers 32 and 33, respectively, by means of clevis type links 34 and 36, respectively.

Bellcrank levers 38 and 39 are pivotally mounted on brackets 41 and 42, respectively, secured to the transom 8, the inner ends of the levers being pivotally connected to opposite ends of the equalizer 32. Bellcrank levers 43 and 44 are pivotally mounted on brackets 46 and 47, respectively, secured to the transom 8a, the inner ends of the levers being pivotally connected to opposite ends of the equalizer 33. The outer ends of the bellcrank levers 38, 39, 43 and 44 are connected to the ends of their respective inner brake levers 14 by means of lost-motion links 48.

The upper end of the actuating lever 28 is pivotally connected to one end of a pull rod 49 having a pulley 51 journaled on its other end. A flexible element 52, such as a chain, is connected to the upper end of the actuating lever 27 and extends around the pulley 51 to a conventional handbrake device 53 mounted on the body of the railway car.

In the operation of the brake arrangement thus shown and described, pressurized air within a tank R is adapted to be supplied through conduit 55 to the power cylinders 23 under control of a valve 54 to cause the piston rods 24 to pivot their respective inner levers 14 which then act through the links 17 to pivot their respective outer levers 16 and thus apply their brake shoes 21 against opposite sides of their respective rotors 9.

In the operation of the handbrake arrangement, manual rotation of the device 53 acts through the flexible element 52 and pull rod 49 to pivot the actuating levers 27 and 28 which then act through the links 34–36, equalizers 32–33, bellcrank levers 38, 39, 43, 44, and links 48 to pivot the brake levers 14 and 16 and apply the brake shoes against their rotors.

I claim:
1. In a rotor brake arrangement for a railway car truck having a truck frame supported on two wheel and axle assemblies, two rotors secured to each assembly, support brackets mounted on the truck frame adjacent their respective rotors, four brake mechanisms mounted on said brackets to frictionally engage their respective rotors, each brake mechanism comprising inner and outer brake levers, brake head-shoe assemblies mounted on adjacent ends of said levers, offset links pivotally suspending said brake head-shoe assemblies from its support bracket, a connecting link pivotally interconnecting medial portions of said levers, a power cylinder mounted on a support bracket and pivotally connected to one end of the outer brake lever, a piston rod extending from the power cylinder and pivotally connected to one end of the inner brake lever and operable to pivot said levers to frictionally engage the brake head-shoe assemblies against opposite sides of a rotor, and a handbrake arrangement to actuate the four brake mechanisms, comprising four bell crank levers pivotally mounted on the truck frame and connected to the ends of their respective inner brake levers, an equalizer interconnecting adjacent bell crank levers, actuating levers connected to their respective equalizer levers, and means to actuate said actuating levers.

2. A rotor brake arrangement according to claim 1 in which said means comprises a pull rod connected to one actuating lever, a pulley of said pull rod, a flexible element connected at one end thereof to the other actuating lever and engaging said pulley, and a manually operable handbrake device connected to the other end of said flexible element.

References Cited by the Examiner

UNITED STATES PATENTS

| | | | |
|---|---|---|---|
| 787,643 | 4/05 | Roediger | 188—107 |
| 2,228,818 | 1/41 | Eksergian | 188—107 |
| 2,815,094 | 12/57 | Simanek et al. | 188—107 X |
| 2,876,869 | 3/59 | Coskun | 188—59 X |
| 3,092,211 | 6/63 | Herbert | 188—59 |
| 3,092,212 | 6/63 | Gaenssle | 188—107 X |

ARTHUR L. LA POINT, *Primary Examiner.*

DUANE A. REGER, *Examiner.*